United States Patent [19]
Havranek

[11] 3,919,486
[45] Nov. 11, 1975

[54] PULSE CORRECTOR

[75] Inventor: Drahomir F. Havranek, Downers Grove, Ill.

[73] Assignee: Western Electric Company, New York, N.Y.

[22] Filed: June 24, 1974

[21] Appl. No.: 482,476

[52] U.S. Cl. .......................... 179/16 EA; 328/164
[51] Int. Cl.[2] .......................... H04Q 1/36
[58] Field of Search ...... 179/16 E, 16 EA; 328/164; 307/293, 293 Q

[56] References Cited

UNITED STATES PATENTS

| | | | |
|---|---|---|---|
| 3,092,691 | 6/1963 | Burns et al. | 179/16 EA |
| 3,282,631 | 11/1966 | Mosinski | 307/293 |
| 3,312,784 | 4/1967 | Draper | 179/16 E |
| 3,703,648 | 11/1972 | Wrabel | 307/293 |
| 3,766,323 | 10/1973 | Wittman | 179/16 EA |

*Primary Examiner*—Kathleen H. Claffy
*Assistant Examiner*—Randall P. Myers
*Attorney, Agent, or Firm*—W. L. Keefauver

[57] ABSTRACT

A pulse corrector circuit is disclosed for responding to input telephone dial pulsing over a range of input pulsing speeds and for providing output dial pulsing at the same speed as the input pulsing but with a substantially constant output duty cycle, or break-to-make percentage ratio as such a duty cycle is referred to in the art. The output duty cycle is determined jointly by a fixed interval timer and a variable interval timer. The variable timer includes a resistance-capacitance time constant network for which an asymptote voltage is provided so that during the variable interval the capacitance changes its voltage toward a prescribed voltage at a rate determined jointly by the time constant and by the value of the asymptote voltage. The fixed timer is controlled by the input pulsing speed to adjust the asymptote voltage to an initial low value and then to a high value sooner or later according to faster or slower input pulsing speeds so that the capacitance voltage reaches the prescribed voltage sooner or later according to input pulsing speed. The total variable time interval prescribes the duration of the output break interval; and, the output make interval is controlled by the amount of overlap, if any, of the fixed and variable intervals.

The pulse corrector is provided with split pulse guard and supervision control circuitry for guarding against input transitions of too short durations to represent legitimate signals and for passing steady-state supervision from input to output.

12 Claims, 4 Drawing Figures

PULSE CORRECTOR

BACKGROUND OF THE INVENTION

The invention relates to the pulse corrector art and particularly to the art of adjusting or regulating the duty cycle or break-to-make percentage ratio of telephone dial pulsing and the like.

Dial pulsing is known to vary from ideal limits as to speed and duty cycle. For instance, in the well-known step-by-step switching art of the telephone field it may be desirable for a number of reasons to maintain dial pulsing at an ideal pulsing speed of about 10 pulses per second (pps) with a duty cycle (break-to-make percentage ratio) of about 150 percent. This means that an ideal pulse length, or total pulse period, is about 100 milliseconds (ms) with a 60 ms break interval and a 40 ms make interval. The duty cycle as referred to herein is the ratio of the break interval to the make interval; but, as is well known, the duty cycle can be defined in other ways such as the ratio between the break interval and the pulse period, between the make interval and the break interval, or between the make interval and the pulse period, each being the equivalent of the other in any given situation.

Due to the practicality of mechanical and electrical design it is necessary that some variation of pulsing speed and duty cycle be tolerated. Thus, for instance, a range of pulsing speeds of from 7.5 ms to 12.5 ms may be tolerated in a specific design situation with the duty cycle (break-to-make percentage ratio) being maintained in the area of 133 percent to 170 percent as an example.

The prior art provides many types of pulse correctors which can accept input dial pulsing over a range of pulsing speeds and which can produce output dial pulsing within the specified speed range and with an output duty cycle also within a specified range. Some of the prior pulse correctors can produce a specified output pulsing speed and a specified output duty cycle as long as the input pulsing speed is within a given range. Other pulse correctors can produce a specified output duty cycle at the same pulsing speed as the input pulsing speed so long as the latter is within a given range.

Pulse correctors which reproduce a range of input pulsing speeds at the output with a specified output duty cycle need to be able to ascertain a measure of the input pulsing speed in order to be able to adjust the make and break intervals of the variable output pulse period so that the duty cycle of the latter is essentially constant over the range of output pulsing speeds. For instance, it may be desired to accept a range of input pulsing speeds from 7.5 pps to 12.5 pps and to produce output pulsing at the speed of the input but at a substantially constant 150 percent duty cycle. The output pulse period will thus vary from about 133 ms for 7.5 pps to about 80 ms for 12.5 pps. In order to maintain a 150 percent output duty cycle, the pulse corrector must produce an 80 ms break interval and a 53 ms make interval at 7.5 pps and a 48 ms break interval and a 32 ms make interval at 12.5 pps. Thus, depending upon the input pulsing speed for any given pulse period, the pulse corrector must be able to vary the break interval from 80 ms to 48 ms and to vary the corresponding make interval from 53 ms to 32 ms in order to maintain the desired 150 percent output duty cycle.

As mentioned above, the prior art includes many pulse correctors capable of accomplishing the above discussed desirable result. The particular type of prior art pulse corrector with which the present invention is concerned is generally in the form of a circuit responsive to a series of input pulses within a range of input pulsing speeds to produce a corresponding series of output pulses having the same pulsing speeds as the corresponding input pulses and having a substantially constant output duty cycle, wherein the output duty cycle is determined jointly by a fixed interval timer and a variable interval timer, wherein the variable timer comprises a resistancecapacitance time constant network, wherein an asymptote voltage is provided for the network so that during the variable interval the capacitance derives a changing voltage at a rate determined jointly by the time constant and the asymptote voltage, and wherein the fixed timer is used to derive a measure of the input pulsing speed (i.e., the input pulse period) and to adjust or change the time constant accordingly so that the variable time interval is adjusted to correspond to the input pulsing speed.

In the above types of prior art circuits the time constant has been adjusted or changed by altering the resistance of the capacitance in various ways to either increase or decrease the rate at which the capacitance changes its voltage toward a prescribed voltage which, when attained, defined the end of the variable interval. While such circuitry has proven quite useful, those skilled in the art are always looking for new ways to produce the desired results and particularly for such ways as might result in economy and simplification of circuit design.

SUMMARY OF THE INVENTION

The above type of prior art pulse corrector with which the present invention is concerned is modified according to the present invention so that the variable time interval is altered under the control of the input pulsing spped by the provision of means for changing the asymptote voltage as the basic time control parameter.

The prior art context within which the present invention finds its novelty is a pulse corrector responsive to a series of input pulses within a range of input pulsing speeds to produce a corresponding series of output pulses having the same pulsing speeds as the corresponding input pulses and having a substantially constant output duty cycle, wherein the output duty cycle is determined jointly by a fixed interval timer and a variable interval timer, wherein output means in controlled according to the output duty cycle to produce output pulses, wherein the variable timer comprises a resistance-capacitance time constant network, and wherein an asymptote voltage is provided for the network so that during the variable interval the capacitance derives a changing voltage at a rate determined jointly by the time constant and the asymptote voltage.

Within the above prior art context the present invention comprises interrelated means for determining the output duty cycle by varying the variable time interval according to input pulsing speed by altering the asymptote voltage for the time constant network. Means is provided and controlled by each input pulse to cause the fixed timer to determine a fixed time interval of a duration corresponding to a particular pulsing speed not faster than the slowest pulsing speed. Means is provided and controlled by the fixed timer at the end of each fixed interval to establish for the network a low asymptote voltage so that the voltage of the capacitance starts to change toward a prescribed voltage at a slow rate corresponding to the low asymptote voltage and so that the voltage of the capacitance reaches the prescribed voltage at the end of maximum variable time interval of a maximum duration corresponding to the said particular pulsing speed. Means is provided and controlled by the fixed timer at the start of the next succeeding fixed interval, if the input pulsing speed is faster than the said particular pulsing speed, to change the low asymptote voltage to a high asymptote voltage so as to allow the changing voltage of the capacitance to continue to change toward the prescribed voltage but at a fast rate corresponding to the high asymptote voltage and so that the changing voltage of the capacitance reaches the prescribed voltage at the end of a variable time interval shorter than the maximum duration and corresponding to the faster input pulsing speed. In this arrangment, the output duty cycle (break-to-make ratio) is defined as the ratio between the total variable time interval and that portion of the fixed time interval which exceeds that portion of the variable time interval during which the voltage of the capacitance changes at the fast rate.

A specific example of the above arrangement might be where a range of input telephone dial pulsing speeds of from 7.5 pps to 12.5 pps is to be reproduced at the output with a desired output duty cycle of 150 percent (i.e., the output break interval is 150 percent of the output make interval). In such a situation, the fixed time interval is made equal to the largest desired output make interval, which a 7.5 pps would be 53 ms or 40 percent of the total longest pulse period of 133 ms. Also, the variable time interval is made equal to the duration of the desired output break interval, varying from a maximum of 80 ms at 7.5 pps (60 percent of the total largest pulse period of 133 ms) to a minimum of 48 ms at 12.5 pps (60 percent of the total shortest pulse period of 80 ms).

In the above example, the leading edge of each input break interval causes the fixed timer to determine the fixed interval. The ending of the fixed interval causes the variable timer to start to determine the variable interval. The variable interval is determined by the time it takes the capacitance to discharge (or charge, depending upon the point of view) from a given charged (or discharged) voltage condition to a prescribed voltage condition under the joint control of the resistance-capacitance network time constant and of the asymptote toward which the discharge (or charge) takes place. It is apparent that for a given time constant the variable time interval will be determined by the asymptote with respect to the given voltage condition. Thus, a relatively low asymptote voltage (less difference between the given voltage and the asymptote voltage) determines that the voltage of the capacitance will reach the prescribed voltage after a relatively long discharge time and a relatively high asymptote voltage (greater difference between the given voltage and the asymptote voltage) determines that the voltage of the capacitance will reach the prescribed voltage after a relatively short discharge time.

At the start of the variable time interval, a low asymptote is established for the network so that under the control of the low asymptote the voltage of the capacitance would change at a slow rate so as to reach the prescribed voltage after the maximum variable time interval of 80 ms. If, due to an increase of input pulsing speed, the next fixed time interval is started before the end of the maximum variable interval of 80 ms, the beginning of the next fixed interval will cause the low asymptote to be changed to a high asymptote so that the voltage of the capacitance continues to change toward the prescribed voltage but at an increased (fast) rate, thus causing the capacitance voltage to reach the prescribed voltage after a time interval shorter than the maximum variable interval of 80 ms, the shorter variable interval corresponding to the increased input pulsing speed.

In the above example, it is noted, except for the maximum output make (the fixed interval of 53 ms) and break (the maximum variable interval of 80 ms) conditions corresponding to the slowest input pulsing speed of 7.5 pps (total pulse period of 133 ms), that the fixed and variable time interval will overlap to an extent depending upon the amount that the input pulsing speed is greater than the slowest speed of 7.5 pps. This overlap is used to define the output duty cycle (break-to-make ratio) as the ratio between the total variable time interval and that portion of the fixed interval which exceeds that portion of the variable time interval during which the voltage of the capacitance changes at the fast rate.

In the above example, the fixed timer is arranged to establish the low asymptote voltage when the fixed timer is not timing and to change the low asymptote voltage to a high asymptote voltage when the fixed timer starts to time while the variable timer is timing under the control of the low asmptote.

BRIEF DESCRIPTION OF THE DRAWING

An illustrative embodiment of the invention is shown in FIG. 2 of the drawing as a transistorized telephone dial pulse corrector, with respect to which

DETAILED DESCRIPTION

Figure 1:
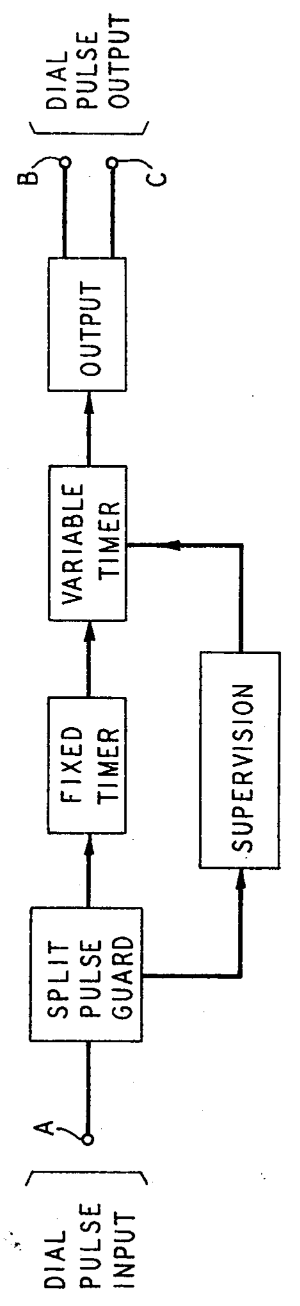
FIG. 1 is a block diagram of the pulse corrector.
Figure 2:
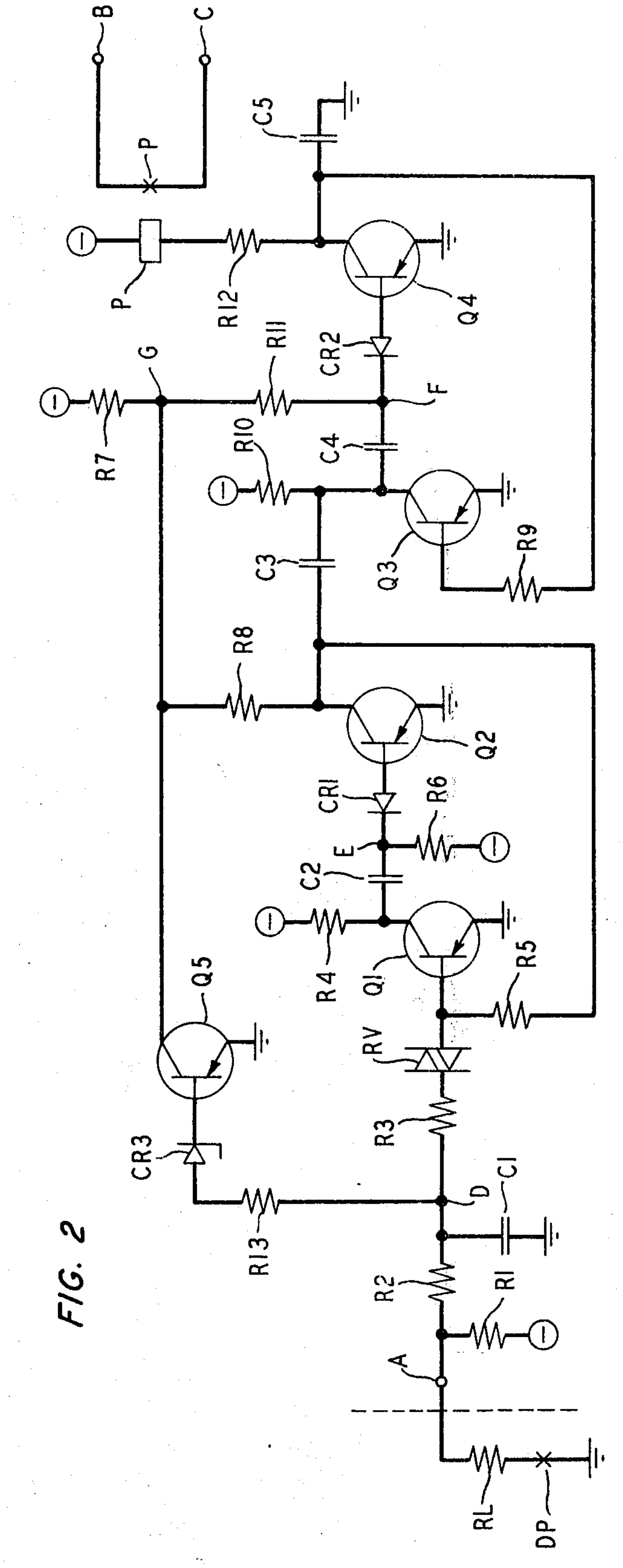

The block diagram of FIG. 1 illustrates the overall functioning of the pulse corrector of FIG. 2. The dial pulse input at terminal A is where input dial pulses appear and are characterized, for example, by low impedance ground conditions as make intervals and by open circuit conditions as break intervals. The dial pulse output at terminals B and C may be characterized, for example, by the output circuit closing a connection between terminals B and C for make intervals and opening the connection for break intervals.

The fixed and variable timers are interposed in FIG. 1 between the input terminal A and the output terminals B and C in order to repeat the input pulsing speed at the output but at a substantially constant output duty cycle, or break-make ratio as it may be referred to. The split pulse guard and supervision functions are for purposes previously mentioned and as will be explained.

The complete pulse corrector circuit is shown in FIG. 2, the operation of which will be explained with the aid of the curves of FIGS. 3 and 4. Terminal A at the left of FIG. 2 is the same as terminal A of FIG. 1. The resistance RL and the contact DP represent the dial pulse input circuity whereby the contact DP is closed (as shown) ground is extended through the relatively low line resistance RL as a make signal to input terminal A and when the contact DP is open terminal A is open circuited according to a break signal. At the right in FIG. 2, terminals B and C, which are the same as the corresponding terminals of FIG. 1, are interconnected by the make contact of relay P when relay P is operated, thus to provide at terminals B and C a "closed loop" make signal, and are disconnected when relay P is released, thus to provide at terminals B and C and "open loop" break signal. The make or closed loop signal is often referred to in the art as an "off-hook" signal; and, the break or open loop signal is often referred to in the art as an "on-hook" signal.

Figure 3:
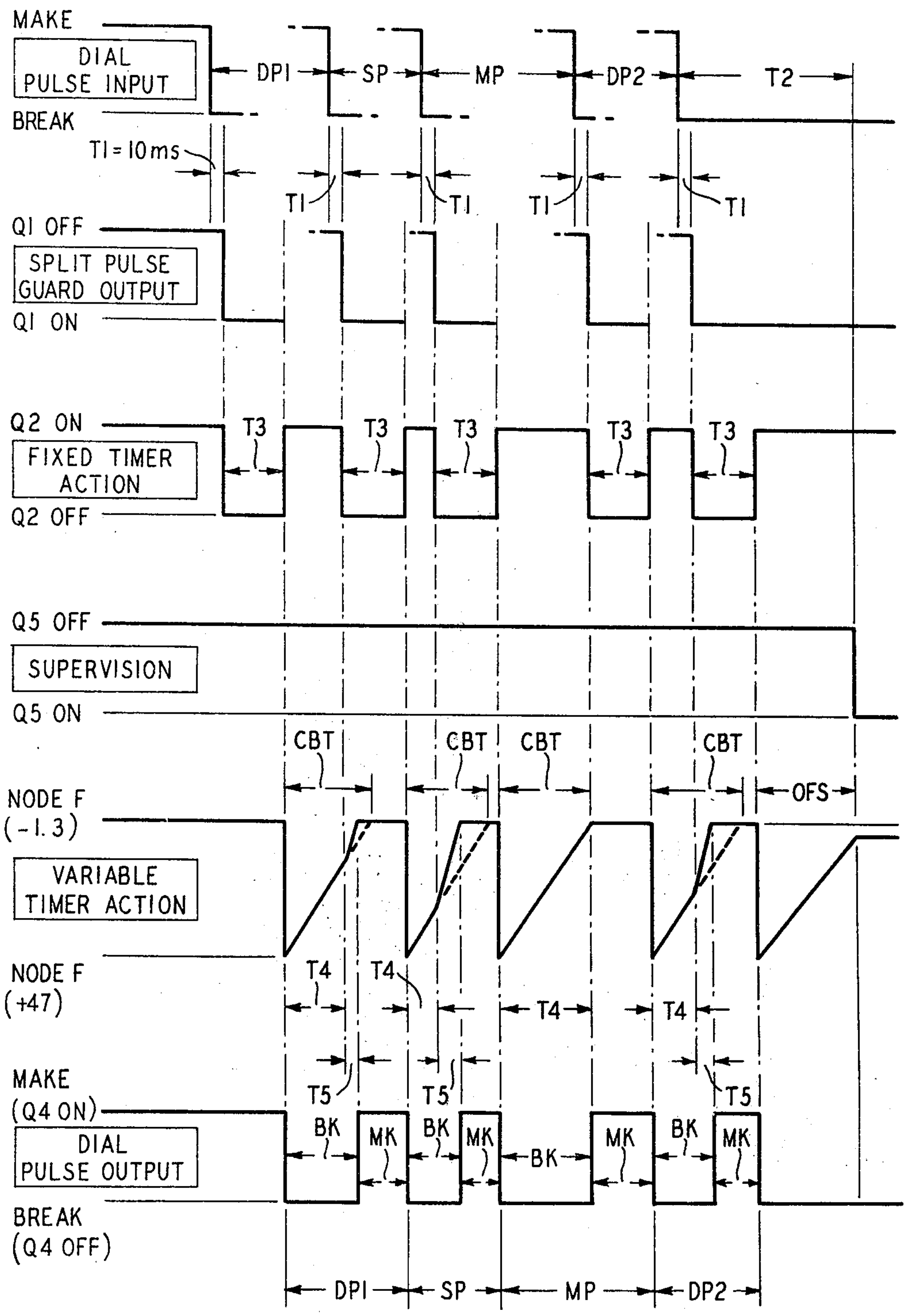
FIG. 3 illustrates the pulse corrector action by a series of curves.

In FIG. 3, the curve representing the dial pulse input is shown changing only from make to break, it being understood that a return from break to make occurs between the successive make-to-break transitions The interval MP indicates the lengths of the maximum or longest input pulse period, such as 133 ms for an assumed slowest input pulsing speed of 7.5 pps. The interval SP likewise indicates the minimum or shortest input pulse period, such as 80 ms for an assumed fastest input pulsing speed of 12.5 pps. Intervals DP1 and DP2 indicate two pulse periods somewhere between the maximum (mp) and the minimum (SP) pulse periods. The interval T2 relates to the supervision function which will be explained.

In FIG. 3, the curve representing the split pulse guard function is shown changing only from the off condition to the on condition of transistor Q1 of FIG. 2, the return transitions being understood to intervene. It will be understood that the "off" condition of a transistor means the cut-off or non-conducting condition and that the "on" condition means a fully-conditioning or saturated transistor.

In FIG. 3, the curve representing the fixed timer action is shown with respect to the on and off conditions, and transitions therebetween, of transistor Q2 of FIG. 2. The fixed time interval is identified as T3 and represents the longest output make interval of 53 ms corresponding to the slowest pulsing speed of 7.5 pps.

In FIG. 3, the curve representing the action of the supervision function will be explained regarding the off and on conditions of transistor Q5 of FIG. 2.

In FIG. 3, the curve representing the variable timer action shows the voltage changes at node F in FIG. 2, transistor Q4 being on only when node F is at about minus 1.3 volts and off when node F is more positive than minus 1.3 volts. The interval CBT is the longest output break interval of 80 ms for the slowest pulsing speed of 7.5 pps. The interval OFS will be explained in connection with the supervision function. The interval T4 represents the time during which the capacitance C4 of FIG. 2 (at the collector of transistor Q3) discharges at the slow rate under the control of a low asymptote voltage. The interval T5 represents the time during which the capacitance C4 continues to discharge but at a high rate under the control of a change of the asymptote voltage from low to high.

In FIG. 3, the curve representing the dial pulse output is shown as make and break signal conditions with transitions therebetween. The interval MP, as in the curve for the dial pulse input, represents the longest output pulse period of 133 ms corresponding to the slowest pulsing speed of 7.5 pps. Similarly, the interval SP represents the shortest output pulse period of 80 ms corresponding to the fastest pulsing speed of 12.5 pps. Also, the intervals DP1 and DP2 represent pulse periods for pulsing speeds between 7.5 pps and 12.5 pps. The intervals BK and MK show the output make and break intervals. It will be noted that the output duty cycle, or break-to-make ratio, is definable in one way as the ratio between the sum of intervals T4 and T5 and that portion of the fixed interval T3 which exceeds the interval T5. That is, the output duty cycle, or output break-to-make ratio BK/MK, is equal to the ratio T4+T5/T3−T5.

Figure 4:
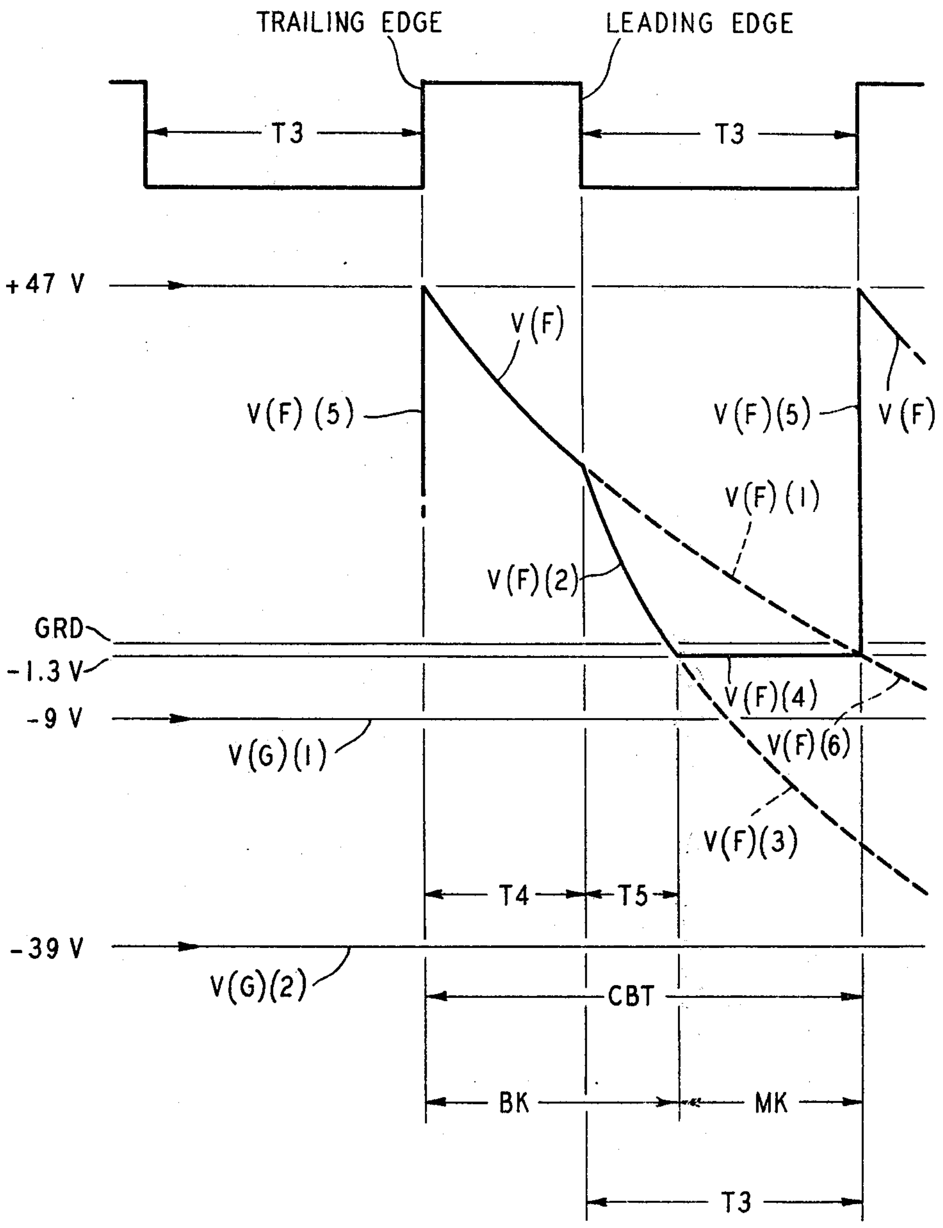
FIG. 4 is an enlargement of parts of FIG. 3.

FIG. 4 is an enlargement of portions of the fixed and variable interval timer action curves of FIG. 3. In FIG. 4, the curve portions designated V(F), V(F)(1), V(F)(2), V(F)(4) and V(F)(5) represent the possible voltage changes in FIG. 2 at the right-hand terminal (node F) of capacitor C4 with regard to the variable timer action. Also, the curve portions V(G)(1) and V(G)(2) indicate the respective low and high asymptote voltages at the junction of resistances R7 and R11 (node G) with respect to which the capacitor C4 discharges to define the variable timer action. The curve portions V(F)(6) and V(F)(3) are shown merely to emphasize that the two discharge curves V(F)(1) and V(F)(2) have different slopes due to the different respective asymptote voltages V(G)(1) and V(G)(2).

In discussing the details of the circuitry of FIG. 2 it is considered advisable to establish a few circuit parameters as a basis for dicussing circuit operation. The power source is 48 volts direct current, the negative terminal being represented by a circle enclosing a minus sign, the positive terminal being grounded. The diodes CR1 and CR2, at the bases of transistors Q2 and Q4 are primarily for protection of those transistors; this type of diode becomes conducting in a low impedance forward-biased condition when the arrow terminal (anode) is made sufficiently more positive than the other terminal (cathode); when conducting in the forward-bias condition, the diode exhibits a voltage drop of about 0.6 volt; and, this type of diode will withstand a reverse voltage (cathode more positive than anode) of about 75 volts before breaking down in the reverse direction. The Zener diode CR3, at the base of transistor Q5, exhibits characteristics similar to those of diodes CR1 and CR2 except that the reverse breakdown voltage is about 24 volts. The varistor RV, at the base of transistor Q1, also exhibits characteristics similar to those of diodes CR1 and CR2 except that varistor RV will conduct in a low impedence forward-biased condition whenever the voltage across it is about 3 volts of either polarity, the polarity determining the direction of current flow. When the transistors Q1 through Q5 are conducting, the base-to-emitter voltage drop is in the area of 0.7 volt, the base being negative with respect to the emitter, and the collector-to-emitter voltage drop is in the area of 0.1 volt, the collector being negative with respect to the emitter.

In the discussion to follow, the inherent operate and release delay times of relay P will be disregarded; but, for a precise timing design, it will be appreciated that such delays should be taken into account. Typical operate and release delays of relay P in the circuit of FIG. 2 are in the respective areas of 1.0 ms and 1.7 ms. These delays may be taken into account when one desires precise timing of the opening and closing of the dial pulse output loop (terminals B and C) under the control of the make contact of relay P.

In FIG. 2, it is to be understood that contact DP is controlled by some suitable means (not shown), such as a relay, for opening and closing the input circuit according to dial pulsing, et cetera.

The circuit of FIG. 2 can assume either of two steady-state conditions represented by a steady on-hook condition (contact DP open) and a steady off-hook condition (contact DP closed). These steady-state conditions must be reflected at the output by the open condition of contact P for an on-hook supervision signal and by the closed condition of contact P for an off-hook supervision signal.

Various points in the circuit will be referred to as "nodes," such as node D at the junction of resistors R2 and R3; and, transistors will be referred to only by their reference designations, such as Q1, Q2, et cetera.

The steady-state on-hook input condition with input contact DP open as a break interval toward terminal A is such as to cause a steady-state on-hook output condition with relay P released and output contact P open as a break interval toward terminals B and C. Q1 is turned on with base current flowing through varistor RV and through resistors R3 and R2 and R1, with collector current flowing through resistor R4, and with the collector of Q1 at a low negative potential near ground. Q5 is turned on with base current flowing through Zener diode CR3 and through resistor R13 to the negative voltage at node D, with collector current flowing through resistor R7, and with node G at the collector of Q5 at a low negative potential near ground. Since node F is at a more positive potential than minus 1.3 volts, Q4 is turned off with no base or collector current, with relay P released, and with the collector of Q4 at a high negative potential near minus 48 volts. With relay P released, contact P is open to repeat the steady-state on-hook condition at the output terminals B and C. Q3 is turned on with base current flowing through resistor R9 to the high negative potential at the collector of Q4, with collector current flowing through resistor R10, and with the collector of Q3 at a low negative potential near ground. Regarding Q2, emitter-to-base current will flow through diode CR1 and resistor R6 with node E at about minus 1.3 volts so that capacitor C2 is essentially discharged.

The steady-state off-hook input condition with input contact DP closed as a make interval toward terminal A is such as to cause a steady-state off-hook output condition with relay P operated and output contact P closed as a make interval toward terminals B and C. Q1 is turned off with its collector at a high negative potential near minus 48 volts. Q5 is turned off with its collector at the potential of node G. Q4 is turned on with base current flowing through diode CR2 and through resistors R11 and R7, with collector current flowing through resistor R12 and relay P, and with its collector at a low negative potential near ground. Relay P is operated by the collector current of Q4; and, the operated relay P causes the closing of contact P to reflect the off-hook supervision as a make interval to the terminals B and C. Q3 is turned off by the low negative potential from the collector of Q4, the collector of Q3 thus having a high negative potential near minus 48 volts. Capacitor C4 will be charged to about 46.7 volts since node F is about minus 1.3 volts and the collector of Q3 is at about minus 48 volts. Q2 is turned on, with base current flowing through diode CR1 and resistor R6, with collector current flowing through resistors R8 and R7, and with its collector at a low negative potential near ground. Capacitor C3 will be charged to about minus 48 volts since the collector of Q3 is about minus 48 volts and the collector of Q2 is about ground. Capacitor C2 is charged to about 46.7 volts since node E is at about minus 1.3 volts and the collector of Q1 is about minus 48 volts.

The significant action of the pulse corrector occurs when a series of dial pulses occurs at input terminal A. These dial pulses will occur following a steady-state off-hook condition; and, the dial pulses will occur as a series of break intervals at the input. During the steady-state off-hook input condition, due to the relatively low line impedance RL compared to the relatively high resistance R1, input terminal A and node D will be at a low negative voltage near ground. When the input contact DP opens, at the first make-to-break input transition, capacitor C1 will start to acquire a more negative charge through resistors R2 and R1; it is assumed that the circuit parameters are chosen to delay the charging of capacitor C1 for about 10 ms before node D can acquire enough negative potential to cause Q1 to conduct.

If the input contact DP should reclose before the end of such a 10 ms interval, representing an input break interval of less than 10 ms duration, capacitor C1 will be discharged (to its initial condition near ground on node D) through R2 and RL, thus to prevent turning on Q1. This 10 ms interval will be recognized as a split guard interval to preclude the pulse corrector from responding to input transients of too short a duration to be recognized as true break interval signals. Thus, as shown in FIG. 3, each make-to-break input transition is shown delayed by a 10 ms time T1 in the split pulse guard circuitry. During the split guard interval, any very short make pulse duration of the input (such as 1 ms or so) from break-to-make-to-break will be integrated due primarily to the presence of resistor R2, thus in effect allowing the split guard interval to continue but with a length slightly longer than the prescribed 10 ms.

If the input break interval lasts at least 10 ms, the voltage at node D in FIG. 2 (i.e., the charge on capacitor C1) will become sufficiently negative to cause Q1 to conduct; but, Q5 will not be turned on since, as above noted, the voltage at node D required to cause Q5 to turn on through Zener diode CR3 is considerably more negative than that required to turn on Q1. Actually, the time required for Q5 to become conducting during an input break interval is made longer than the longest expected input break interval (such as 120 ms) but shorter than the longest output pulse period (133 ms) plus the 10 ms time T1 (a total of 143 ms), such as about 130 ms in a typical case as indicated by the time T2 in FIG. 3. If the input break interval ends before the expiration of time T2, as it should under the assumed dial pulse conditions, then Q5 will remain turned off so as not to affect the variable timer controlling the output transistor Q4. As will be seen, Q4 will be turned off in response to an input break interval (which exceeds 10 ms) so as to release relay P to repeat the break signal at the output terminals B and C. Also, as will be seen, if the input break interval lasts for the 130 ms time T2, Q5 will be turned on, to in turn cause Q4 to remain turned off, thus to maintain the break output signal. As in the case of the split guard interval, any short (1 ms or so) duration input change from break-to-make-to-break will also extend the turn-on time T2 of Q5 so that, in effect, the slightly longer time T2 compensates for the slightly longer time T1 insofar as the overall operation of the pulse corrector is concerned.

While the split guard timing interval T1 is taking place (i.e., before Q1 is turned on), Q2 and Q4 are conducting with the collector of Q2 near ground and with node F at about minus 1.3 volts. Collector current is drawn by Q2 through resistors R7 and R8 and base current is drawn by Q4 through resistors R7 and R11 with the node G at about minus 39 volts. When the split guard time T1 expires (10 ms), Q1 is turned on causing the collector of Q1 to change in a positive direction from about minus 48 volts to about ground, thus causing node E to be driven to about plus 46.7 volts (minus 1.3 plus 48) to cut off conduction through Q2. When Q2 cuts off, its collector changes negatively from about ground to a potential of about minus 28 volts due to base current drawn by Q1 through resistors R5, R8, and R7. The negative change of some 28 volts at the collector of Q2 momentarily drives the collector of Q3 toward minus 76 volts, from its previous voltage of about minus 48 volts. This negative change does not affect node F which is clamped at minus 1.3 volts due to the base current of Q4 which remains on; and, the collector of Q3 will quickly revert to about minus 48 volts due to the very low impedance of the base-to-emitter path through the conducting Q4. The negative voltage feedback from the collector of Q2 to the base of Q1 through resistor R5 maintains Q1 in the on condition as long as Q2 is off. Thus, any change of the input contact DP from break back to make after Q2 turns off will not turn off Q1. Therefore, once a break interval is recognized (i.e., longer than 10 ms), Q2 is turned off to measure the fixed interval T3 of 53 ms; and, during the fixed interval, Q1 will remain on regardless of any transient situation at input contact DP.

At the base of Q2, node E, which was driven to about plus 46.7 volts when Q1 turned on to turn off Q2, starts to change from plus 46.7 volts toward minus 48 volts as capacitor C2 discharges through R6 and Q1 on. The parameters are arranged so that node E will reach about minus 1.3 volts some 53 ms after Q1 turned on to turn off Q2. When node E reaches about minus 1.3 volts the diode CR1 and the base-emitter junction of Q2 become forward-biased to allow Q2 to turn on. This turning on of Q2 defines the end of the fixed interval T3 of 53 ms.

When Q2 turns on at the end of the fixed interval T3 of 53 ms, the collector of Q2 changes from about minus 28 volts to about ground, a positive change of some 28 volts. This removes the negative voltage feedback through resistor R5 to the base of Q1, thus allowing the input contact DP to again control the condition of Q1. That is, if the DP contact is still open (break) at the time Q2 turns on, then Q1 will remain on; but, if the DP contact has returned to a closed condition (make) at the time Q2 turns on, then Q1 will turn off. If Q1 is still on, it will turn off when the input contact DP returns to a make condition. The turning off of Q1 in any case will not affect the on condition of Q2 since the negative change at the collector of Q1 from about ground to about minus 48 volts is in a direction (as manifested by a plus through capacitor C2 to the node E) to sustain the on condition of Q2.

As soon as Q2 turns on at the end of the fixed interval T3 of 53 ms (which will be about 63 ms after the start of the input break interval upon the opening of the contact DP), Q2 is subject to being turned off again only by Q1 being turned on by a succeeding make-to-break transition of input contact DP. The effect of such an occurrence will be discussed later. It will be recalled that at the fastest dialing speed of 12.5 pps (80 ms pulse period), the next succeeding input make-to-break transition cannot affect Q1 and Q2 until some 27 ms after Q2 is turned on at the end of the fixed interval of 53 ms. Also, at the slowest dialing speed of 7.5 pps (133 ms pulse period), the next succeeding input make-to-break transition cannot affect Q1 and Q2 until some 80 ms after Q2 is turned on at the end of the fixed interval of 53 ms.

When Q2 turns on at the end of the fixed interval T3 of 53 ms, the positive change of some 28 volts (from minus 28 to ground) at the collector of Q2 is reflected through C3 as a positive change of the collector of Q3 from minus 48 volts to minus 20 volts and is reflected through C4 as a positive change of node F from minus 1.3 volts to plus 26.7 volts. This positive change at node F back-biases diode CR2 and turns off Q4. When Q4 turns off, relay P is released to provide at the output terminals B and C the initial make-to-break transition to define the start of the first output break interval. Also, the collector of Q4 will change from about ground to about minus 48 volts, thus turning on Q3. When Q3 turns on its collector changes from about minus 20 volts to about ground, thus applying another 20 volt positive drive through capacitor C4 to node F. Node F will thus be about plus 46.7 volts.

At the time that node F is driven to about plus 46.7 volts, with Q4 off, Q3 on and Q2 on, the charge on capacitor C4 starts to discharge so that node F starts to change from plus 46.7 volts toward minus 1.3 volts, which is the voltage of node F at which Q4 will again be turned on. Capacitor C4 discharges under the control of an RC time constant determined by the following equation:

$$RC(1) = [C4] \times \left[R11 + \frac{R7 \times R8}{R7 + R8}\right].$$

The asymptote voltage for the discharge of capacitor C4 is the voltage at node G and is determined by the values of R7 and R8 while Q2 is on. This voltage is given by the equation:

$$V(G)(1) = \left[\frac{R8}{R7 + R8}\right] \times [\text{minus } 48 \text{ volts}].$$

With typical parameters, RC(1) equals about 41 ms and V(G)(1) equals about minus 9 volts. Under the control of RC(1) and V(G)(1), capacitor C4 will start to discharge so that the voltage at node F starts to change from plus 46.7 volts toward minus 9 volts as an asymptote with minus 1.3 volts as the prescribed voltage of node F at which Q4 will turn on. This discharge rate of capacitor C4 is a relatively slow rate compared to another discharge rate as will be explained. The slow discharge rate is adjusted so that at such rate the voltage at node F will cause Q4 to turn on 80 ms after Q4 turned off, the 80 ms representing in FIG. 3 the maximum length (CBT) of time interval T4, which in turn is the longest output break interval BK of 80 ms corresponding to 60 percent of the longest output pulse period MP of 133 ms corresponding to the slowest output pulsing speed of 7.5 pps.

Assuming that the input pulsing speed is at the slowest rate of 7.5 pps, the next input make-to-break transition will be released from the split guard circuit by the turning on of Q1 at the same time as Q4 is turned on at the end of the longest output break interval CBT. When these actions occur, Q4 will turn on to reoperate relay P to close contact P at the output to end the output break interval, Q3 will be turned off when Q4 turns on, and Q2 will turn off when Q1 turns on. Q2 will, as before, remain off for the fixed time interval T3 of 53 ms corresponding to the longest output make interval corresponding to 40 percent of the longest output pulse period MP of 133 ms corresponding to the slowest output pulsing speed of 7.5 pps.

Returning to the previous conditions (Q4 off, relay P released, Q3 on, Q2 on and Q1 off), where capacitor C4 was discharging so that the voltage of node F was changing from plus 46.7 toward minus 1.3 volts with minus 9 volts at node G as the discharge asymptote V(G)(1), it will be recalled that the time constant RC(1) of the discharge was about 41 ms in a typical case. If the input pulsing speed is greater than the slowest speed of 7.5 pps, then the next input make-to-break transition will be released from the split guard circuit by the turning on of Q1 at a time prior to the time when Q4 would be turned on under the control of RC(1) and V(G)(1). As shown in FIG. 3, such action will end the variable time interval T4 short of the maximum variable interval CBT; but, as will be explained, capacitor C4 is allowed to continue to discharge but at a faster rate.

When Q1 turns on before the end of the maximum variable time interval CBT, Q2 will be turned off as before to begin the usual fixed time interval T3. At that time, with Q1 on and Q2 off, Q4 remains off with relay P released, Q3 remains on, and the voltage at node F continues to change toward minus 1.3 volts where Q4 will turn on. However, this continuation of the discharge of capacitor C4 is arranged to be at a faster rate than before. The time constant RC(1) of the slow discharge period T4 (Q2 on and Q1 off) was given as $$RC(1) = [C4] \times \left[R11 + \frac{R7 \times R8}{R7 + R8}\right]$$

with a typical value of about 41 ms. The asymptote voltage V(G)(1) at node G for the slow discharge period T4 was given as $$V(G)(1) = \left[\frac{R8}{R7 + R8}\right] \times \text{minus 48 volts}$$

with a typical value of about minus 9 volts. The time constant RC(2) of the faster discharge period T5 (Q2 off and Q1 on) is given by $$RC(2) = [C4] \times \left[R11 + \frac{R7 \times (R5 + R8)}{R7 + (R5 + R8)}\right]$$

with a typical value of about 49 ms. RC(2) of 49 ms is about 19.5 percent greater than RC(1) and represents a larger time constant for what has been referred to as the faster discharge period T5. The latter is understood when it is appreciated that a much greater change occurs in the asymptote voltage of node G so that the change in asymptote is the only significant change. The asymptote voltage V(G)(2) of the faster discharge period T5 (Q2 off and Q1 on) is given by $$V(G)(2) = \left[\frac{R5 + R8}{R5 + R7 + R8}\right] \times [\text{minus 48 volts}]$$

with a typical value of about minus 39 volts. Thus, V(G)(2) is about 333 percent greater than V(G)(1). So, even though the time constant of the discharge circuit for C4 changes slightly from about 41 ms to about 49 ms for the respective slow and fast discharge periods T4 and T5, nevertheless the asymptote voltage at node G changes considerably from about minus 9 volts to about minus 39 volts for the respective slow and fast discharge periods T4 and T5. The change of voltage at node G from about minus 9 volts to about minus 39 volts is a change of the asymptote voltage whereby, regardless of the fact that the time constant may have increased slightly, capacitor C4 will continue to discharge but at a fast rate so that the voltage at node F will reach minus 1.3 volts to turn on Q4 sooner than would otherwise occur.

From the above, and with regard to FIG. 3, it will be apparent that the total variable time interval is the sum of the slow and fast discharge times T4 and T5. Also, the sum of times T4 and T5 is less than the maximum variable time interval CBT, which contains a slow discharge time T4 but no fast discharge time T5. It is also apparent that the output break interval equals to total variable time interval, which is the sum of time periods T4 and T5 where time period T5 may vary from a value of zero for the slowest input pulsing speed to some finite value which is a measure of the extent to which the input pulsing speed is faster than the slowest such speed. Furthermore, it is apparent that the amount of the fixed time interval T3 (53 ms) which is effective to produce the output make interval is a maximum (53 ms) for the slowest input pulsing speed of 7.5 pps and is less than the maximum by the amount of the fast discharge time T5, the reduction in the amount of time T3 effective to produce the output make interval being according to the amount that the input pulsing speed is greater than the slowest such speed.

FIG. 4 is an enlargement of parts of FIG. 3 to show the comparison of the slow and fast discharge times of capacitor C4. The curve sections V(F), V(F)(1) and V(F)(5) show the voltage changes at node F in FIG. 2 throughout a vairable time interval of the longest time during which the time constant of the discharge of capacitor C4 is under the control of the low asymptote V(G)(1) of minus 9 volts at node G. The time CBT represents the time (maximum variable time interval) it takes node F to reach the minus 1.3 volts V(F)(4) while capacitor D4 is discharging from about plus 47 volts toward minus 1.3 volts V(F)(4) with an asymptote V(G)(1) of minus 9 volts. If Q2 is turned off (leading edge of time T3) before node F reaches the prescribed voltage of minus 1.3 volts, then the discharge curve V(F) will continue along curve V(F)(2) at a faster rate toward the prescribed voltage V(F)(4) of minus 1.3 volts since the high asymptote V(G)(2) of minus 39 volts renders the discharge curve V(F)(2) steeper. When curve V(F)(2) reaches the minus 1.3 volt point V(F)(4) Q4 will turn on and node F will remain at minus 1.3 volts V(F)(4) until the end of the fixed interval T3 when Q2 turns on to turn Q4 off. The total variable time interval represents the output break interval and is the sum of the slow and fast discharge times R4 and T5; whereas, the amount of the fixed interval T3 which exceeds the fast discharge time T5 represents the output make interval.

The supervision circuitry of FIG. 2 comprises transistor Q5 and its control over the variable timer and thus over the output transistor Q4. Q5 is off when the input condition is a make condition (contact DP closed). When the input contact DP opens to signify a make-to-break transition, capacitor C1 will begin to charge so as to acquire an increasingly more negative voltage at node D as previously described. As previously noted, the voltage at node D will reach about minus 3 volts so as to turn on Q1 after a delay of about 10 ms to mask short transients. The turning on of Q1 initiates the development of the output pulsing as explained. It will be recalled that at the end of the first fixed time interval T3, Q4 is turned off to release relay P so that contact P is opened as a break signal to the output terminals B and C. At the same time as the make-to-break transition at input contact DP starts the 10 ms split guard interval timing by the charging of capacitor C1, the supervision interval T2 is also started. The interval T2 is about 130 ms which is the time required for capacitor C1 to charge to a negative voltage at node D sufficient to turn on Q5 through the 24 Zener diode CR3. When a make-to-break transition occurs at input contact DP, such a break interval should be an ideal interval of 80 ms for the longest pulse period of 133 ms at the slowest pulsing speed of 7.5 pps; but, the input break interval may be longer than the ideal 60 percent of the pulse period of 133 ms. Any number of factors may cause an input break interval of varying length; but, if such an interval lasts longer than a particular maximum (such as 120 ms) it is usual to recognize such a situation as an abandoned call (continued on-hook condition) or a disconnect (continued on-hook condition) or as a "wink" signal (long on-hook break) for supervision control. This is similar to the technique well known in the art of recognizing a continued off-hook signal as a call initiation, or the interdigital time during digit dialing or a conversation time after a completed connection. At the input to Q5 of FIG. 2, if the input reverts to a make condition before Q5 turns on, capacitor C1 will be rapidly discharged with no effect on Q5.

The supervision turn-on time T2 for Q5 is chosen in a typical case as about 130 ms, which is about 13 ms less than the sum (143 ms) of the longest pulse period of 133 ms and the split guard delay time of 10 ms. This will insure that if the input contact DP remains in a break (on-hook) condition for 130 ms, Q5 will turn on after the time T2, which will be some 13 ms prior to when Q4 would be turned on after the longest output break interval CBT. In FIG. 3, the time OFS on the curve for node F represents the lapse of about 67 ms during the slow discharge time of capacitor C4 and is about 13 ms prior to the time when Q4 would turn on. Since Q5 will turn on at the end of time period T2, the collector of Q5 will become a very low negative voltage near ground at node G. This very low voltage at node G will prevent node F from reaching the necessary minus 1.3 volts to turn Q4 on. Thus, Q4 will be held off by the turning on of Q5 and the output will remain in a break (on-hook) condition.

The following are suitable components for a typical pulse corrector circuit for accomplishing the described functions and circuit interaction, the code being the Western Electric Company standard coded item:

| Transistors | Resistors |
|---|---|
| | (ohms –K equals times 1000) |
| Q1 - Q5..Code 51B | R1..15K..Code 257J |
| Varistor | R2..100..Code 257J |
| RV..Code 106A | R3..30.1K..Code 257J |
| Relay | R4..3.9K..Code KS-13491-L2 |

-continued

| Transistors | Resistors |
|---|---|
| P..Code 337A | R5..20K..Code 257A |
| Capacitors (microfarads) | R6..100K..Code 257A |
| C1..10..Code 604A | R7..4.7K..Code 221A |
| C2..0.706..Code 535BA | R8..1.1K..Code 221A |
| C3..0.0619..Code 594C | R9..49.9K..Code 257J |
| C4..2.71..Code 535GJ | R10..2K..Code KS-13492-L1 |
| C5..0.169..Code 594C | R11..14.3K..Code 257A |
| Diodes | R12..3K..Code KS-13491-L1 |
| CR1-CR2..Code 458A | R13..10K..Code 257J |
| CR3..Code 459AG | |

In the particular exemplary context of the above parameters, as has been discussed, the fixed time interval T3 of FIGS. 3 and 4 was chosen as 53 ms to correspond to the longest duration output make interval corresponding to 40 percent of the longest output pulse period of 133 ms for the slowest pulsing speed of 7.5 pps. The fixed interval T3 may be longer than the 53 ms which corresponds to the slowest pulsing speed. It is necessary only that the fixed interval be equal to or longer in duration thanthe make interval of the longest possible duration dial pulse period. That is, in FIG. 3 the fixed interval T3 must be equal to or greater than the extent to which the maximum length pulse period MP exceeds the corrected break time CBT of the maximum length pulse period. If a fixed interval T3 is chosen to be longer than its allowable minimum duration, there will always be a fast discharge time T5 at the end of each slow discharge time T4; whereas, if a fixed interval is chosen, as in the example, equal to its allowable minimum duration, there will be no fast discharge time T5 at the slowest pulsing speed.

It is to be understood that the above-described arrangement is illustrative of the application of the principles of the invention. Other arrangements may be devised by those skilled in the art without departing from the spirit and scope of the invention. It will be apparent that variations may be devised for taking into account ranges of pulsing speeds different from the range of 7.5 pps to 12.5 pps used for illustrative purposes herein. Also, output duty cycles (break-to-make percentage ratios) other than the exemplary 150 percent may be found useful. Furthermore, the invention may be embodied in circumstances other than merely to deal with telephone dial pulsing. Also, whereas particular time durations, particular voltages, and other such particular circuit parameters have been specified in the context of the exemplary embodiment, it will be obvious that such parameters may be varied over considerable limits depending on the desired results. In addition, while it is desirable to provide split guard and supervision control is in the exemplary embodiment, it will be obvious that the invention might be employed in certain circumstances without being associated with such auxiliary circuitry.

Also, it will be apparent that more types of input and output signaling may be employed, other than the particular types shown herein by example, such as loop signaling, battery and ground signaling and the like. Furthermore, with regard to the supervision turn-on time T2 for Q5, which has been prescribed at 130 ms in a typical case, it will be appreciated that such a time interval T2 may have some tolerance, say from about 110 ms to about 140 ms. The maximum T2 of 140 ms will still be less than the sum (143 ms) of the longest output pulse period (133 ms) and the split guard interval (10 ms). The minimum T2, however, of 110 ms could occur some 10 ms prior to the end of the longest expected input break interval of 120 ms, thus presenting a "worst case" situation. According to the latter situation, should Q5 turn on at 110 ms, node G at the collector of Q5 would be changed from about minus 9 volts to about minus 0.1 volt, thus causing the slow discharge curve V(F)(1) of FIG. 4 to flatten out somewhat (still slower discharge rate) due to the still lower asymptote (change from minus 9 volts to minus 0.1 volt). The flattening of curve V(F)(1) toward the asymptote of minus 0.1 volt would prevent node F from reaching minus 1.3 volts so that Q4 could not turn on unless the input should change from break-to-make. The latter could occur at 120 ms, turning Q5 off and restablishing at node G the minus 9 volt asymptote which thus would allow node F to reach the minus 1.3 volts at which Q4 could turn on. Thus, in the worst case where the minimum supervision turn-on time T2 for Q5 is 110 ms with the longest expected input break interval of 120 ms, the length of the output break interval would be slightly longer than the 80 ms previously prescribed; otherwise, allowing a range of about 110 ms to about 140 ms for the time T2 in view of a possible maximum input break interval of 120 ms does not affect the overall operation of the pulse corrector.

What is claimed is:

1. A pulse corrector responsive to a series of input pulses within a range of input pulsing speeds to produce a corresponding series of output pulses having the same pulsing speeds as the corresponding input pulses and having a substantially constant output duty cycle, wherein the output duty cycle is determined jointly by a fixed interval timer and a variable interval timer, wherein output means is controlled according to the output duty cycle to produce output pulses, wherein the variable timer comprises a resistance-capacitance time constant network, and wherein an asymptote voltage is provided for the network so that during the variable interval the capacitance derives a changing voltage at a rate determined jointly by the time constant and the asymptote voltage, wherein the improvement comprises A. means controlled by each input pulse to cause the fixed timer to determine a fixed time interval of a duration corresponding to a particular pulsing speed not faster than the slowest pulsing speed;

B. means controlled by the fixed timer at the end of each fixed interval to establish for the network a low asymptote voltage so that the voltage of the capacitance starts to change toward a prescribed voltage at a slow rate corresponding to the low asymptote voltage and so that the changing voltage of the capacitance reaches the prescribed voltage at the end of a maximum variable time interval of a maximum duration corresponding to the said particular pulsing speed;

C. and, means controlled by the fixed timer at the start of the next succeeding fixed interval, if the input pulsing speed is faster than the said particular pulsing speed, to change the low asymptote voltage to a high asymptote voltage so as to allow the changing voltage of the capacitance to continue to change toward the prescribed voltage at a fast rate corresponding to the high asymptote voltage and so that the changing voltage of the capacitance reaches the prescribed voltage at the end of a variable time interval shorter than the maximum duration and corresponding to the faster input pulsing speed;

D. the output cycle being defined as the ratio between the total variable time interval and that portion of the fixed time interval which exceeds that portion of the variable time interval during which the voltage of the capacitance changes at the fast rate.

2. The invention defined in claim 1 wherein

A. the network includes 1. a first circuit connectable as part of the network to provide the low asymptote voltage;
2. and a second circuit connectable as part of the network to provide the high asymptote voltage;

B. the asymptote voltage establishing means connects the first circuit as part of the network;

C. and, the asymptote voltage changing means connects the second circuit as part of the network.

3. The invention defined in claim 2 wherein

A. is provided a source of supply voltage larger than the high asymptote voltage;

B. the network includes a dropping resistance, a main resistance and a capacitance, the dropping resistance being connected between the source and one end of the main resistance, the capacitance being connected to the other end of the main resistance, the connection of the dropping resistance at the said one end of the main resistance defining a junction;

C. the first circuit comprises a first amount of control resistance connectable in parallel with the series connection of the main resistance and the capacitance so as to provide the low asymptote voltage at the junction;

D. and, the second circuit comprises a second amount of control resistance larger than the first amount and connectable in parallel with the series connection of the main resistance and the capacitance so as to provide the high asymptote voltage at the junction.

4. The invention defined in claim 3 wherein

A. the first amount of control resistance is a first fixed resistance;

B. the second amount of control resistance includes a second fixed resistance in series with the first fixed resistance;

C. the asymptote voltage establishing means provides effectively a short circuit across the second fixed resistance;

D. and, the asymptote voltage changing means effectively removes the short circuit.

5. The invention defined in claim 4 wherein

A. the supply voltage, the high asymptote voltage, the low asymptote voltage, and the prescribed voltage are the same polarity of direct current voltage and are of successively lower voltage in the order stated;

B. the asymptote voltage establishing means momentarily charges the capacitance to a direct current voltage opposite to the said same polarity so that the voltage of the capacitance starts to change by discharge of the capacitance toward the prescribed voltage;

C. and, the asymptote voltage changing means allows the discharge of the capacitance to continue toward the prescribed voltage.

6. The invention defined in claim 5 wherein the value of the second fixed resistance is sufficiently large compared to the value of the first fixed resistance so that
A. the high asymptote voltage is relatively large compared to the low asymptote voltage;
B. a relatively small increase occurs in the time constant of the network due to the removal of the short circuit across the second fixed resistance;
C. and, the relatively large change of asymptote voltage from low to high allows a substantial increase in the discharge rate of the capacitance in the presence of the relatively small increase in the time constant.

7. A pulse corrector responsive to a series of input pulses within a range of pulse period time durations, where the pulse period of each input pulse consists of a first pulse interval of one character followed immediately by a second pulse interval of another character, to produce a corresponding series of output pulses, where the pulse period of each output pulse is the same as the pulse period of the corresponding input pulse and where a substantially constant output ratio is maintained between first and second output intervals for each output pulse, wherein the output ratio is determined jointly by a fixed interval timer and variable interval timer, wherein output means is controlled according to the output ratio to produce output pulses, wherein the variable timer comprises a resistance-capacitance time constant network, and wherein an asymptote voltage is provided for the network so that during the variable interval the capacitance derives a changing voltage at a rate determined jointly by the time constant and the asymptote voltage, wherein the improvement comprises
A. means controlled by each input pulse at the start of each first input interval to cause the fixed timer to determine a fixed time interval of a duration equal to the second output pulse interval corresponding to a particular pulse period for which the particular second output pulse interval is not shorter than the longest duration second output interval corresponding to the longest duration pulse period;
B. means controlled by the fixed timer at the end of each fixed interval to establish for the network a low asymptote voltage so that the voltage of the capacitance starts to change toward a prescribed voltage at a slow rate corresponding to the low asymptote voltage and so that the changing voltage of the capacitance reaches the prescribed voltage at the end of a maximum variable time interval of a maximum duration equal to the first output pulse interval of the said particular pulse period for which the particular first output pulse interval is not shorter than the longest duration first output interval corresponding to the longest duration pulse period;
C. and, means controlled by the fixed timer at the start of the next succeeding fixed interval, if the input pulse period is of shorter duration than said particular pulse period, to change the low asymptote voltage to a high asymptote voltage so as to allow the changing voltage of the capacitance to continue to change toward the prescribed voltage at a fast rate corresponding to the high asymptote voltage and so that the changing voltage of the capacitance reaches the prescribed voltage at the end of a variable time interval shorter than the maximum duration and corresponding to the shorter duration input pulse period;
D. the output ratio being defined as the ratio between the total variable time interval and that portion of the fixed time interval which exceeds that portion of the variable time interval during which the voltage of the capacitance changes at the fast rate.

8. The invention defined in claim 7 wherein
A. the network includes
1. a first circuit connectable as part of the network to provide the low asymptote voltage;
2. and a second circuit connectable as part of the network to provide the high asymptote voltage;
B. the asymptote voltage establishing means connects the first circuit as part of the network;
C. and, the asymptote voltage changing means connects the second circuit as part of the network.

9. The invention defined in claim 8 wherein
A. is provided a source of supply voltage larger than the high asymptote voltage;
B. the network includes a dropping resistance, a main resistance and a capacitance, the dropping resistance being connected between the source and one end of the main resistance, the capacitance being connected to the other end of the main resistance, the connection of the dropping resistance at the said one end of the main resistance defining a junction;
C. the first circuit comprises a first amount of control resistance connectable in parallel with the series connection of the main resistance and the capacitance so as to provide the low asymptote voltage at the junction;
D. and, the second circuit comprises a second amount of control resistance larger than the first amount and connectable in parallel with the series connection of the main resistance and the capacitance so as to provide the high asymptote voltage at the junction.

10. The invention defined in claim 9 wherein
A. the first amount of control resistance is a first fixed resistance;
B. the second amount of control resistance includes a second fixed resistance in series with the first fixed resistance;
C. the asymptote voltage establishing means provides effectively a short circuit across the second fixed resistance;
D. and, the asymptote voltage changing means effectively removes the short circuit.

11. The invention defined in claim 10 wherein
A. the supply voltage, the high asymptote voltage, the low asymptote voltage, and the prescribed voltage are the same polarity of direct current voltage and are of successively lower voltage in the order stated;
B. the asymptote voltage establishing means momentarily charges the capacitance to a direct current voltage opposite to the said same polarity so that the voltage of the capacitance starts to change by discharge of the capacitance toward the prescribed voltage;
C. and, the asymptote voltage changing means allows the discharge of the capacitance to continue toward the prescribed voltage.

12. The invention defined in claim 11 wherein the value of the second fixed resistance is sufficiently large compared to the value of the first fixed resistance so that A. the high asymptote voltage is relatively large compared to the low asymptote voltage;

B. a relatively small increase occurs in the time constant of the network due to the removal of the short circuit across the second fixed resistance;

C. and, the relatively large change of asymptote voltage from low to high allows a substantial increase in the discharge rate of the capacitance in the presence of the relatively small increase in the time constant.

* * * * *